(12) United States Patent
Delker et al.

(10) Patent No.: US 8,391,930 B1
(45) Date of Patent: *Mar. 5, 2013

(54) METHOD AND SYSTEM FOR USING USER-SELECTED ALERT PATTERNS

(75) Inventors: Jason R. Delker, Olathe, KS (US); John M. Everson, Kansas City, MO (US)

(73) Assignee: Sprint Spectrum L.P., Overland Park, KS (US)

(*) Notice: Subject to any disclaimer, the term of this patent is extended or adjusted under 35 U.S.C. 154(b) by 915 days.

This patent is subject to a terminal disclaimer.

(21) Appl. No.: 12/345,867

(22) Filed: Dec. 30, 2008

Related U.S. Application Data

(63) Continuation of application No. 11/157,503, filed on Jun. 21, 2005, now Pat. No. 7,493,146.

(51) Int. Cl.
*H04B 1/38* (2006.01)
*H04M 1/00* (2006.01)

(52) U.S. Cl. ............ 455/567; 455/557; 455/569.1; 455/556.1; 379/455; 379/428.02; 379/142.15

(58) Field of Classification Search ......... 455/550.1, 455/553.1, 557, 569.1, 569.2, 572, 575.1, 455/418–420, 567, 552.1, 574, 556.1, 565, 455/566, 74.1, 74, 90.2, 90.3, 563, 426.1, 455/426.2, 414.1; 379/201.01, 413.02, 413.01, 379/447, 446, 455, 428.02, 355.01, 142.04, 379/142.15, 142.17, 142.03
See application file for complete search history.

(56) References Cited

U.S. PATENT DOCUMENTS

| | | | |
|---|---|---|---|
| 4,959,851 A | 9/1990 | Tobolski | |
| 5,715,296 A | 2/1998 | Schornack et al. | |
| 5,812,637 A | 9/1998 | Schornack et al. | |
| 5,832,378 A | 11/1998 | Zicker et al. | |
| 5,878,344 A | 3/1999 | Zicker | |
| 5,946,616 A | 8/1999 | Schornack et al. | |
| 6,115,604 A | 9/2000 | Lester et al. | |
| 6,400,964 B1 | 6/2002 | Zicker et al. | |
| 6,526,277 B1 | 2/2003 | Zicker et al. | |
| 6,704,580 B1 | 3/2004 | Fintel | |
| 6,775,522 B2 | 8/2004 | Schornack et al. | |
| 6,778,824 B2 | 8/2004 | Wonak et al. | |
| 6,785,517 B2 | 8/2004 | Schornack et al. | |
| 6,788,953 B1 | 9/2004 | Cheah et al. | |
| 6,804,536 B1 | 10/2004 | Bultman | |
| 6,987,988 B2 | 1/2006 | Uchiyama | |
| 7,110,789 B1 | 9/2006 | Curtiss et al. | |
| 7,493,146 B1 | 2/2009 | Delker et al. | |
| 2004/0092295 A1 | 5/2004 | Yamada | |
| 2004/0109558 A1 | 6/2004 | Koch | |
| 2004/0152461 A1 | 8/2004 | Schornack et al. | |
| 2005/0003813 A1 | 1/2005 | Wonak et al. | |
| 2005/0025308 A1 | 2/2005 | Tischer et al. | |
| 2005/0070271 A1 | 3/2005 | Lie et al. | |
| 2005/0239496 A1* | 10/2005 | Sylvain | 455/552.1 |
| 2008/0207202 A1* | 8/2008 | Zellner et al. | 455/435.1 |
| 2009/0059907 A1* | 3/2009 | Sindhwani et al. | 370/354 |
| 2011/0080899 A1* | 4/2011 | Delker et al. | 370/338 |

FOREIGN PATENT DOCUMENTS

GB 2365266 A 2/2002

* cited by examiner

*Primary Examiner* — Sujatha Sharma

(57) ABSTRACT

A user selects a ringtone or other alert pattern that can be played to provide notification of an incoming call and provisions the user-selected alert pattern into a mobile station. The mobile station is communicatively coupled to a docking station. When the mobile station receives an incoming call, the docking station plays the user-selected alert pattern through one or more audio systems associated with the docking station.

15 Claims, 3 Drawing Sheets

METHOD AND SYSTEM FOR USING USER-SELECTED ALERT PATTERNS

CROSS-REFERENCE TO RELATED APPLICATIONS

This is a continuation of U.S. patent application Ser. No. 11/157,503, filed Jun. 21, 2005, which application is incorporated herein by reference.

BACKGROUND

1. Field of the Invention

The present invention relates to telecommunications and, more particularly, to a method and system that uses a docking station to extend the use of a user-selected alert pattern provisioned in a mobile station to other audio systems.

2. Description of Related Art

It is becoming increasingly popular for mobile station users to personalize their mobile stations by provisioning user-selected ringtones into their mobile stations. In this way, when a user's mobile station receives an incoming call, the mobile station alerts the user by playing a ringtone that may be differentiated from the ringtones played by other mobile stations. Such user-selected ringtones may include, for example, music, sound effects, celebrity voices, or other sounds.

Although user-selected ringtones are popular, their use is typically limited to mobile stations. Accordingly, it would be desirable to be able to extend the use of a ringtone that a user has selected for a mobile station to other types of devices.

SUMMARY

In a first principal aspect, an exemplary embodiment of the present invention provides a method of using a user-selected alert pattern. In accordance with the method, the user-selected alert pattern is provisioned into a mobile station. The mobile station is coupled to a docking station. In response to an incoming call, the user-selected alert pattern is played through an audio system associated with the docking station.

In a second principal aspect, an exemplary embodiment of the present invention provides a docking station comprising a mobile station interface for communicatively coupling at least one mobile station, a processor, a storage system, and a set of instructions stored in the storage system. The instructions are executable by the processor to download at least one alert pattern from the at least one mobile station through the mobile station interface and to store the at least one alert pattern in the storage system.

DETAILED DESCRIPTION OF EXEMPLARY EMBODIMENTS

1. Overview

Figure 1:
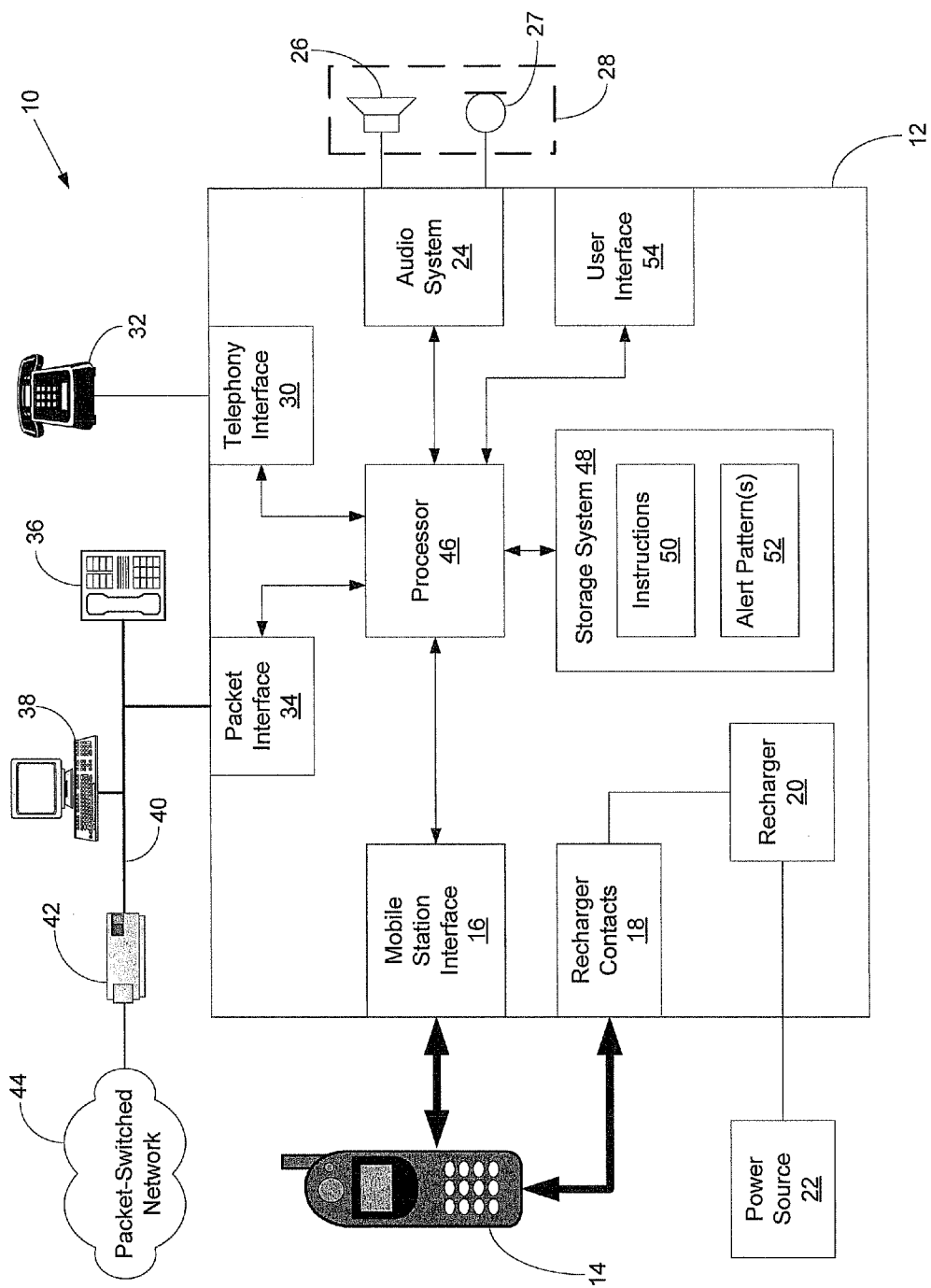
FIG. 1 is a simplified block diagram of a system for using user-selected alert patterns, in accordance with an exemplary embodiment of the present invention.

The present invention, in its preferred embodiments, can extend the use of an alert pattern, such as a ringtone, that a user has selected for a mobile station to other types of devices. Such other devices may include, for example, internal or external speakers, voice-over-packet (VoP) communication devices, such as VoP telephones or audio-equipped computers, or any other device with an audio system that can play the alert pattern.

The mobile station with the user-selected alert pattern could be, for example, a wireless telephone, a wirelessly-equipped personal digital assistant (PDA), or wireless e-mail device. The mobile station may play the user-selected alert pattern to alert the user of an incoming call, e-mail message, instant message, and/or other type of communication. The user-selected alert pattern could be auditory, such as a ringtone, or it could be visual, such as a graphical or textual display. In some cases, the user-selected alert pattern may have both an auditory component and a visual component.

The user-selected alert pattern is an alert pattern that has been specifically selected by the user. More particularly, a user may select an alert pattern for a mobile station that differs from the mobile station's default or standard alert pattern. In order for the mobile station to use the user-selected alert pattern rather than its default alert pattern, the user may need to specifically request the user-selected alert pattern and cause it to be provisioned into the mobile station. In some cases, the user may pay a fee to accomplish this. For example, the user may access a website with a menu of available alert patterns and then select and purchase a particular alert pattern. The selected alert pattern may then be provisioned into the user's mobile station via a wireless network. For example, the wireless network may push the selected alert pattern to the mobile station, e.g., in a short message service (SMS) message or by using an over-the-air provisioning protocol, or the user may instruct the mobile station to download the selected alert pattern via the wireless network. Alternatively, the user may provision the user-selected alert pattern into the mobile station in other ways.

To enable a user to extend the user-selected alert pattern to other devices, an exemplary embodiment of the present invention provides a docking station for the mobile station. The docking station is associated with one or more audio systems that can play the user-selected alert pattern. For example, a suitable audio system may be built into the docking station. The built-in audio system may include a speaker and microphone disposed on the docking station. Alternatively or additionally, the built-in audio system may communicate with external speakers and/or microphones, e.g., in a "dumb" external speaker/microphone terminal, via either a wired or wireless interface. The docking station may also be associated with audio systems that are in communication devices such as analog telephones, VoP telephones, or audio-equipped computers, which devices may be communicatively coupled to the docking station via either wired or wireless interfaces.

Although an analog telephone might be connected to the docking station, it is to be understood that the docking station might not be able to play the user-selected alert pattern through a conventional analog telephone that includes its own ringer. In that case, the docking station could play the user-select pattern through another audio system on behalf of the analog telephone, e.g., through a speaker disposed on the docking station or through a wireless call notification device placed near the analog telephone. An exemplary wireless call notification device is described in U.S. patent application Ser. No. 11/110,458, filed Apr. 20, 2005, which application is incorporated herein by reference.

To extend the use of the user-selected alert pattern to other devices, the docking station may obtain the user-selected alert pattern from the mobile station and play the user-selected alert pattern through one or more audio systems associated with the docking station. The docking station may obtain the user-selected alert pattern from the mobile station in different ways. In one approach, the mobile station receives an incoming call while communicatively coupled to the docking station. In response, the mobile station transmits the user-selected alert pattern, e.g., as an audio signal, to the docking station. The docking station then conveys the user-selected alert pattern from the mobile station to the one or more audio systems. Thus, in this approach, the user-selected alert pattern may simply pass through the docking station, e.g., as an audio signal, from the mobile station to the one or more audio systems.

In another approach, the docking station downloads the user-selected alert pattern from the mobile station, e.g., as a file, and stores it in a storage system. The file could be, for example, a MIDI, WAV, MP3, or Ringing Tones Text Transfer Language (RTTTL) file, or the file could be in some other format. In response to an incoming call, the docking station conveys the user-selected alert pattern stored in the storage system to the one or more audio systems. In this approach, the docking station could play the user-selected alert pattern through the audio systems even when the mobile station is not communicatively coupled to the docking station. For example, the docking station might download and store the user-selected alert pattern at a time when the mobile station is coupled to it. At a later time, the mobile station may be de-coupled from the docking station, but the user-selected alert pattern stored in the storage system may still be available to play through the audio systems associated with the docking station.

2. Exemplary System

FIG. 1 is a simplified block diagram of an exemplary system 10 for using user-selected alert patterns, e.g., to alert the user of an incoming call. System 10 includes a docking station 12 to which at least one mobile station, such as mobile station 14, may be communicatively coupled. Mobile station 14 may be, for example, a wireless telephone, a wirelessly-equipped personal digital assistant (PDA), or wireless e-mail device. Mobile station 14 may be able to send and receive voice, data, and/or other media via one or more wireless networks. Such wireless networks may include wireless wide area networks (WWANs), e.g., using CDMA or GSM, and/or wireless local area networks (WLANs), e.g., using 802.11, 802.16, Bluetooth, HiperLAN, or HomeRF.

To communicatively couple to mobile station 14, docking station 12 may include a mobile station interface 16 that is able to transmit signals to and receive signals from mobile station 14. Such signals may include control signals, data, and/or audio signals, e.g., alert signals and the voice or other media exchanged during a call. In some embodiments, mobile station 14 becomes communicatively coupled to mobile station interface 16 via direct electrical connection. For example, mobile station interface 16 may include electrical contacts that mate with corresponding electrical contacts on mobile station 14. Alternatively, mobile station 14 may be electrically connected to mobile station interface 16 via an electrical cable. In some embodiments, mobile station 14 may be able to wirelessly couple to mobile station interface 16, for example, using Bluetooth, 802.11, or IrDA.

Docking station 12 may also include recharger contacts 18 for recharging mobile station 14 when it is connected to docking station 12. Recharger contacts 18 are connected to a recharger 20, which, in turn, is connected to a power source 22. Power source 22 may be an AC power source, such as a standard wall outlet, or a DC power source, such as an AC adapter, or one or more batteries. Power source 22 may power other components in docking station 12 in addition to recharger 20. When recharger contacts 18 are electrically connected to corresponding contacts on mobile station 14, either directly or through a cable, recharger 20 may operate to recharge mobile station 14.

Docking station 12 may be physically configured so as to include a cradle or other receptacle for receiving mobile station 14. Electrical contacts for mobile station interface 16 and/or recharger contacts 18 may be disposed in the receptacle so as to mate with corresponding contacts on mobile station 14 when mobile station 14 is properly positioned in the receptacle.

Docking station 12 may also include a built-in audio system 24 for processing audio signals. Such processing may include, for example, amplification, digital-to-analog conversion, and/or analog-to-digital conversion. Audio system 24 may also include a speaker 26 and a microphone 27. Audio system 24 may play audio signals through speaker 26, such as alert patterns or the voice or other media exchanged during a call. Audio system 24 may also process audio signals received through microphone 27, such as voice from a user during a call.

Speaker 26 and microphone 27 could be disposed on docking station 12. Alternatively, speaker 26 and microphone 27 could be in a "dumb" speaker/microphone terminal 28 communicatively coupled to audio system 24. Speaker/microphone terminal 28 could be electrically connected, e.g., plugged into, audio system 24, or could be wirelessly coupled to audio system 24, e.g., using 802.11, Bluetooth, or IrDA. Although FIG. 1 shows audio system 24 with only one speaker and one microphone, it is to be understood that audio system 24 may be connected to multiple speakers and microphones. For example, docking station 12 may be configured so as to allow multiple "dumb" speaker/microphone terminals to be communicatively coupled to audio system 24.

Docking station 12 may also include one or more interfaces for communicatively coupling other types of communication devices. For example, docking station 12 may include a telephony interface 30 for communicatively coupling to one or more analog telephony devices, such as analog telephone 32. Telephony interface 30 may transmit audio signals to and from analog telephone 32 and may convert between the analog format used by analog telephone 32 and the digital format used in docking station 12. Telephony interface 30 may also include circuitry to detect whether analog telephone 32 is on-hook or off-hook, a signal generator for generating central office signals such as dial tones, ringback tones, and busy signals.

Docking station 12 may also include a packet interface 34 for communicatively coupling to VoP devices, such as VoP telephone 36 and audio-equipped computer 38. Packet interface 34 may be connected to VoP telephone 36 and audio-equipped computer 38 via a local area network (LAN) 40. LAN 40 may, in turn, be connected to other devices, which may use LAN 40 to exchange data and/or to exchange voice or other media in a packetized format.

LAN 40 may be connected to a network access device 42, which, in turn, may be connected to a packet-switched network 44. Packet-switched network 44 may be a wide area network (WAN), such as the Internet. Network access device 42 could be, for example, a cable modem, DSL modem, or router. Docking station 12, VoP telephone 36, and/or audio-equipped computer 38 may communicate with other devices via a packet-switched network 44, for example, to originate or receive VoP calls.

Although FIG. 1 shows packet interface 34, VoP telephone 36, audio-equipped computer 38, and network access device 42 interconnected via a wired LAN, it is to be understood that these elements could also interconnected via a wireless LAN, e.g., using Bluetooth or 802.11.

Docking station 12 may also include a processor 46, which may be coupled to mobile station interface 16, audio system 24, telephony interface 30, packet interface 34, and to a storage system 48. Storage system 48 may include volatile and/or non-volatile memory. Storage system 48 may store software programming, e.g., as a set of instructions 50, and may store various types of data. In particular, storage system 48 may store one or more alert patterns 52. As described in more detail below, alert patterns 52 may include one or more user-selected alert patterns downloaded from mobile station 14. Storage system 48 may store alert patterns 52 as MIDI, WAV, MP3, or RTTTL files, or in some other format.

Processor 46 may also be coupled to a user interface 54, through which processor 46 may receive input from the user and through which processor 46 may convey information to the user. Thus, user interface 54 may include a keypad, touch screen, buttons, or other input devices to receive input from the user. User interface 54 may also include a display screen or other output device to convey information to the user, e.g., in a graphical or textual form. In some cases, user interface 54 may be used in conjunction with audio system 24, e.g., to originate or to answer calls.

Processor 46 may control the operation of docking station 12 in accordance with instructions 50 stored in storage system 48 and in accordance with instructions provided by the user through user interface 54. In operation, processor 46 may convey audio signals, e.g., in a digital format, between mobile station interface 16, audio system 24, telephony interface 30, packet interface 34, and storage system 48. For example, in order to alert a user of an incoming call, processor 46 may convey a user-selected alert pattern to audio system 24, to telephony interface 30, and/or to packet interface 34. Processor 46 may obtain the user-selected alert pattern that it conveys by receiving it from mobile station 14, e.g., when mobile station 14 receives an incoming call, or processor 46 may retrieve the user-selected alert pattern from storage system 48. Audio system 24 may, in turn, play the user-selected alert pattern through speaker 26, and packet interface 34 may convey the user-selected alert pattern to VoP telephone 36 and audio-equipped computer 38 so that it can be played through their respective audio systems. Analog telephone 32, however, might include its own ringer, so that docking station 12 might not be able to cause analog telephone 32 to ring in accordance with the user-selected alert pattern. In that case, docking station 12 might not ring analog telephone 32 at all. Instead, docking station 12 could play the user-selected alert pattern through another audio system on behalf of analog telephone 32.

Processor 46 may also convey the voice or other media exchanged during a call between mobile station interface 16, audio system 24, telephone interface 30, and packet interface 34. In this way, when mobile station 14 is engaged in a call while communicatively coupled to docking station 12, audio system 34, analog telephone 32, and VoP telephone 36 may participate in the call.

When mobile station 14 is communicatively coupled to docking station 12, mobile station 14 may become involved in calls in various ways. For example, while communicatively coupled to docking station 12, mobile station 14 might still use a wireless network to originate and receive calls, e.g., in a manner similar to when mobile station 14 is de-coupled from docking station 12. However, with mobile station 14 communicatively coupled to docking station 12, audio system 24, analog telephone 32, or VoP telephone 36 may also be able to participate in such calls and may be able to control mobile station 14, e.g., to originate or answer calls.

In other cases, while communicatively coupled to docking station 12, mobile station 14 may use packet-switched network 44, via network access device 42, to originate and receive calls, instead of the wireless network. In still other cases, while communicatively coupled to docking station 12, mobile station 14 may be able to use either the wireless network or packet-switched network 44 to originate and receive calls.

Thus, mobile station 14 might receive a call via either the wireless network or via packet-switched network 44. In either case, docking station 12 may play a user-selected alert pattern from mobile station 14 through one or more other communication devices, such as audio system 24, VoP telephone 36, or audio-equipped computer 38, to provide notification of the incoming call. Even when mobile station 14 is not communicatively coupled to docking station 12, docking station 12 may still be able to receive a call, e.g., via packet-switched network 44. In response, docking station 12 may also use a user-selected pattern to alert audio system 24, VoP telephone 36, and/or audio-equipped computer 38, e.g., from among alert patterns 52 stored in storage system 48. The alert pattern used by docking station 12 when mobile station 14 receives the call could be the same or different then the alert pattern used when other devices receive a call.

Thus, docking station 12 may obtain one or more user-selected alert patterns from mobile station 14, and docking station 12 may play the user-selected patterns in response to calls to mobile station 14 and/or in response to calls to other devices.

3. Exemplary Operation

Figure 2:
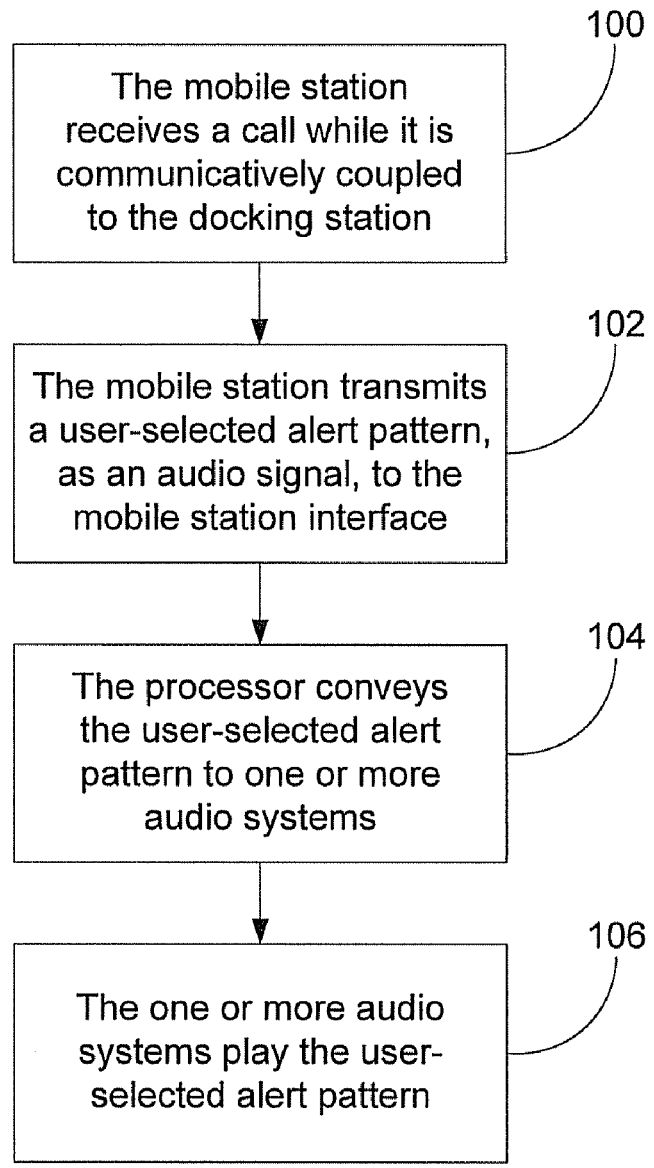
FIG. 2 is a flow chart illustrating a method of using a user-selected alert pattern, in accordance with an exemplary embodiment of the present invention.

In one exemplary embodiment, when mobile station 14 receives a call, a user-selected alert signal from mobile station 14 passes through docking station 12 so as to be played through other communication devices. This first approach is illustrated in FIG. 2.

The process may begin when mobile station 14 receives a call, e.g., a call directed to a directory number associated with mobile station 14, while mobile station 14 is communicatively coupled to docking station 12, as indicated by block 100. In response, mobile station 14 transmits a user-selected alert pattern, as an audio signal, to mobile station interface 16, as indicated by block 102. Mobile station 14 may, at the same time, also play the user-selected alert pattern, e.g., through a speaker disposed on mobile station 14.

The user-selected alert pattern is an alert pattern that the user has previously selected and provisioned into mobile station 14. The user-selected alert pattern may be provisioned so as to apply to all calls received by mobile station 14. Alternatively, the user-selected pattern may apply to only certain calls received by mobile station 14. For example, different user-selected alert patterns may be associated with different called numbers and/or with different calling numbers.

In response to the transmission of the user-selected alert pattern by mobile station 14, processor 46 may convey the user-selected alert pattern to one or more audio systems, as indicated by block 104. For example, processor 46 may convey the user-selected alert pattern to built-in audio system 24 and to VoP communication devices via packet interface 34. The one or more audio systems may then play the user-selected alert pattern, as indicated by block 106. For example, audio system 24 may play the alert pattern through speaker 26 in speaker/microphone terminal 28. VoP telephone 36 and audio-equipped computer 38 may play the alert pattern through their respective speakers.

In this way, the user may be alerted of an incoming call by a user-selected alert pattern played at multiple locations. For example, mobile station 14 may be located in one room of the user's residence, speaker/microphone terminal 28 may be located in another room, and VoP telephone 36 may be located in still another room. The user may then be able to answer the call from any of those locations. Accordingly, the user can provision a user-selected alert pattern into one device, i.e., mobile station 14, and extend its use to other devices, such as speaker/microphone terminals, VoP communication devices, and/or other audio systems, which devices may be disposed in other, potentially more convenient locations.

Figure 3:
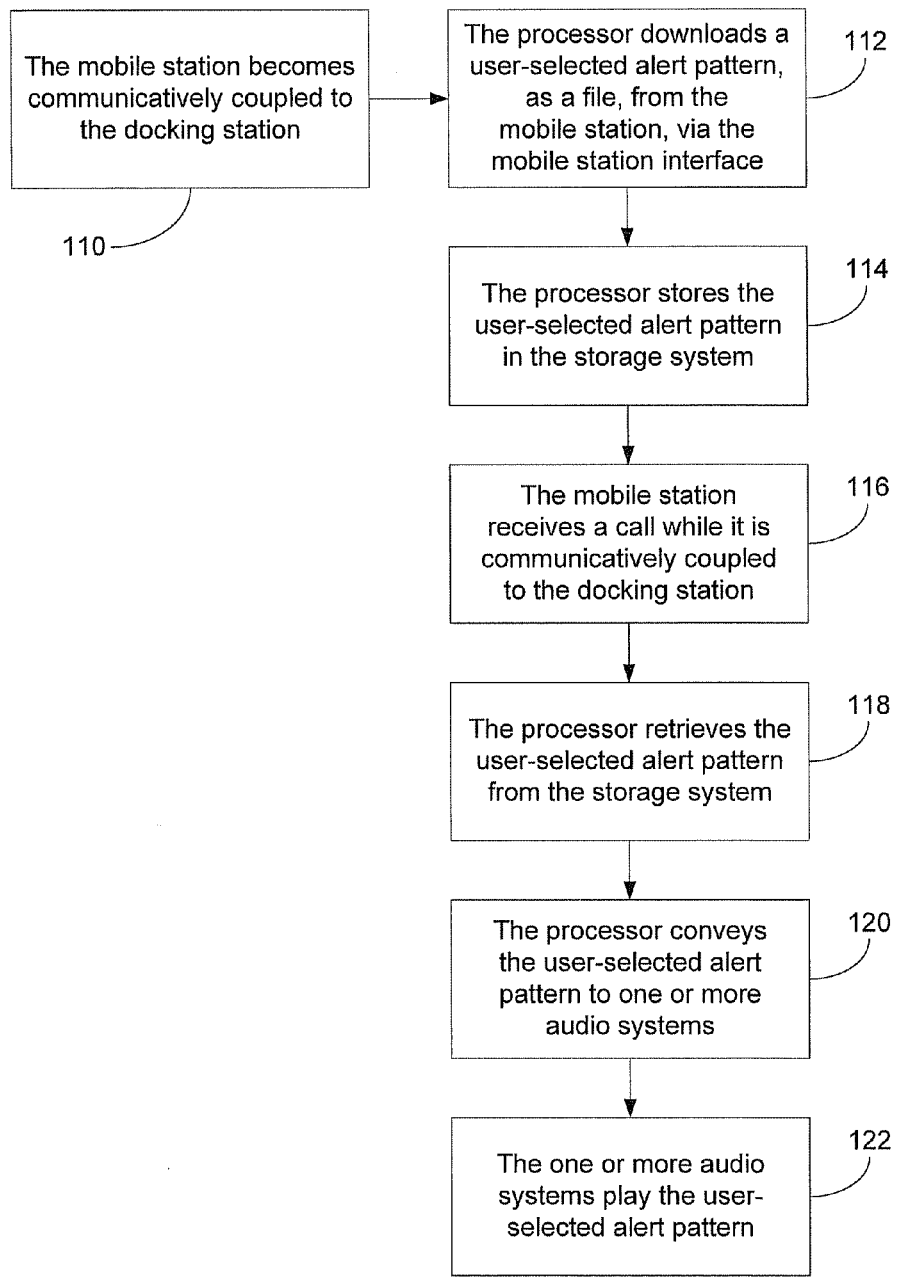
FIG. 3 is a flow chart illustrating a method of using a user-selected alert pattern, in accordance with an exemplary embodiment of the present invention.

In another exemplary embodiment, docking station 12 obtains a user-selected alert pattern from mobile station 14 in advance of receiving an incoming call and stores the user-selected alert pattern so that it can be played at a later time. This second approach is illustrated in FIG. 3.

The process may begin when mobile station 14 becomes communicatively coupled to docking station 12, as indicated by block 110. While mobile station 14 is communicatively coupled in this way, processor 46 downloads a user-selected alert pattern, as a file, from mobile station 14, via mobile station interface 16, as indicated by block 112. The download may occur automatically, e.g., in response to mobile station 14 becoming communicatively coupled to docking station 12. Alternatively, the download may occur in response to an instruction from a user, e.g., input via user interface 54. Processor 46 stores the downloaded user-selected alert pattern in storage system 48, as indicated by block 114.

At some point, while it is communicatively coupled to docking station 12, mobile station 14 receives a call, e.g., a call directed to a directory number associated with mobile station 14, as indicated by block 116. In response, processor 46 retrieves the user-selected alert pattern from storage system 48, as indicated by block 118. Processor 46 may be informed of the incoming call in various ways. For example, when it receives the call, mobile station 14 may transmit a signal via mobile station interface 16, so that the signal is detected by processor 46.

Processor 46 then conveys the user-selected alert pattern from storage system 48 to one or more audio systems, as indicated by block 120. For example, processor 46 may convey the user-selected alert pattern to audio system 24 and to VoP communication devices via packet interface 34. The one or more audio systems may then play the user-selected alert pattern, as indicated by block 122. Thus, audio system 24 may play the user-selected alert pattern, e.g., through speaker 26 of speaker/microphone terminal 28, and the VoP communication devices coupled to packet interface 34 may play the user-selected alert pattern through their respective speakers. In this way, the user may be alerted of an incoming call by a user-selected alert pattern played at multiple locations.

Although in the example of FIG. 3 the incoming call was directed to mobile station 14 while mobile station 14 was communicatively coupled to docking station 12, it is to be understood that docking station 12 may respond similarly to other incoming calls. For example, with mobile station 14 de-coupled from docking station 12, docking station 12 might still be able to receive calls, e.g., via packet-switched network 44. Such calls may be to a directory number that is associated with mobile station 14, with docking station 12, or with other devices. In response to the incoming call, docking station 12 may retrieve the user-selected alert pattern from storage system 48 and play it through audio systems associated with docking station 12, e.g., as indicated by blocks 118 through 122.

Accordingly, the user can provision a user-selected alert pattern into one device, i.e., mobile station 14, and extend its use to other devices in other locations, such as analog telephony devices, VoP communication devices, and/or other audio systems, for calls directed to a mobile station 14 and/or for calls directed to other devices.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:

1. A method, comprising:
   communicatively coupling a mobile station to a docking station;
   while said mobile station is communicatively coupled to said docking station, said docking station downloading a user-selected alert pattern from said mobile station and storing said user-selected alert pattern in a storage system in said docking station;
   de-coupling said mobile station from said docking station; and
   in response to an incoming call, while said mobile station is de-coupled from said docking station, retrieving said user-selected alert pattern from said storage system in said docking station and playing said user-selected alert pattern through a voice-over-packet (VoP) device communicatively coupled to said docking station.

2. The method of claim 1, wherein said user-selected alert pattern is a user-selected ringtone.

3. The method of claim 1, further comprising:
   provisioning said user-selected alert pattern into said mobile station.

4. The method of claim 1, wherein said incoming call is a call to a directory number associated with said mobile station.

5. The method of claim 1, wherein playing said user-selected alert pattern through a voice-over-packet (VoP) device communicatively coupled to said docking station comprises:
   said docking station conveying said user-selected alert pattern from said storage system to said VoP device.

6. A docking station, comprising:
   a mobile station interface for communicatively coupling at least one mobile station;
   a processor;
   a packet interface;
   a storage system; and
   a set of instructions stored in said storage system and executable by said processor to (i) download at least one alert pattern from said at least one mobile station through said mobile station interface and store said at least one alert pattern in said storage system and (ii) convey a selected alert pattern from said storage system to said packet interface in response to an incoming call when said at least one mobile station is de-coupled from said docking station.

7. The docking station of claim 6, further comprising:
   recharger contacts for recharging said mobile station.

8. The docking station of claim 6, further comprising:

an audio system, wherein said instructions are further executable by said processor to convey said selected alert pattern from said storage system to said audio system in response to said incoming call.

9. The docking station of claim 8, wherein said audio system is communicatively coupled to a speaker/microphone terminal and plays said selected alert pattern through said speaker/microphone terminal.

10. The docking station of claim 8, further comprising:

a telephony interface, wherein said telephony interface is communicatively coupled to an analog telephone.

11. The docking station of claim 10, wherein said audio system plays said selected alert pattern on behalf of said analog telephone.

12. The docking station of claim 6, wherein said packet interface is communicatively coupled to a voice-over-packet (VoP) device and transmits said selected alert pattern to said VoP device.

13. The method of claim 3, wherein provisioning said user-selected alert pattern into said mobile station comprises:

said mobile station receiving said user-selected alert pattern via a wireless network.

14. The method of claim 1, wherein said docking station downloads said user-selected alert pattern from said mobile station in response to said mobile station becoming communicatively coupled to said docking station.

15. The method of claim 1, wherein said docking station downloads said user-selected alter pattern from said mobile station in response to input received via a user interface.

* * * * *